United States Patent [19]

Plath

[11] 3,726,163
[45] Apr. 10, 1973

[54] RAPID ACTION CLAMP

[75] Inventor: Bernhard Plath, Eiserfeld, Germany

[73] Assignee: Amsted-Siemag Kette GmbH, Betzdorf/Sieg, Germany

[22] Filed: Sept. 8, 1971

[21] Appl. No.: 178,559

[30] Foreign Application Priority Data

Jan. 22, 1971 Germany..................P 21 02 955.0

[52] U.S. Cl. ..................................82/36 A
[51] Int. Cl. ...................................B23b 29/00
[58] Field of Search................82/36, 36 A; 29/96

[56] References Cited

UNITED STATES PATENTS

| 3,326,070 | 6/1967 | Muller | 82/36 A |
|---|---|---|---|
| 3,595,110 | 7/1971 | Topliss | 82/36 A |
| 3,613,483 | 10/1971 | Cinadr | 82/36 A |

Primary Examiner—Harrison L. Hinson
Attorney—Toren and McGeady

[57] ABSTRACT

A rapid action clamp is of the kind which comprises a housing containing a axially slidable thrust plunger for applying thrust to the part which is to be clamped, the plunger being pivotally connected to one end of a clamping strut the other end of which fits in a recess in an axially fixed actuator which is mounted so that it is rotatable about an axis eccentric to the axis of the thrust plunger. Rotation of the actuator moves the clamping strut between a position in which it is skewed to the plunger axis and a position in which it extends along this axis so that in so doing it moves the thrust plunger along its axis to apply the clamping thrust. The clamping strut or another part through which the clamping thrust is transmitted is compressible in the direction of thrust transmission against spring loading so that during the movement of the clamping strut towards its axially extending position, the springs are compressed so that the thrust is gradually increased and as the strut reaches its axial position, the spring becomes fully compressed so that the thrust is transmitted through rigid members.

6 Claims, 4 Drawing Figures

RAPID ACTION CLAMP

This invention relates to rapid action clamps, particularly clamps for clamping tools, jigs and workpieces to machine tools, the clamps being of the kind comprising a housing containing an axially slidable thrust plunger for applying thrust to the part which is to be clamped, the thrust plunger being pivotally connected to one end of a clamping strut the other end of which fits in a recess in an axially fixed actuator cup which is mounted so that it is rotatable about an axis eccentric with respect to the axis of the thrust plunger to move the clamping strut between a position in which it is skew to the plunger axis and a position in which it extends along this axis.

In a known type of rapid action clamp, the actuator cup can be rotated about its axis by an operator using a key. The actuator cup is mounted eccentrically in the housing, so that when it is rotated the clamping strut, which is skew to the axis of the thrust plunger when the clamp is in its non-tightened state, is swung into an axial position. This increases the axial extent of the clamping strut so that the clamping strut applies through the trust plunger a clamping thrust to the tool or part which is to be clamped. Rapid action clamps of this known kind are simple in construction and reliable in operation. Only a moderate torque need be applied by the operator to obtain a satisfactory clamping effect. The swinging of the clamping strut produces a very high clamping thrust. This known kind of rapid action clamp provides the particular advantage that it considerably reduces friction and abrasion inherent in screw-threaded clamps and reduces the risk of cracks appearing in the screw thread of the clamp. However even though the torque which needs to be applied by the operator is indeed considerably reduced by this known type of rapid action clamp, nevertheless the torque is still disadvantageously high and it has been found desirable to reduce this torque still further, particularly during the early part of the clamping action.

The object of the present invention is to provide a rapid action clamp of the type described above which is free from the disadvantage mentioned above. The rapid action clamp in accordance with the invention is intended to enable the operator to increase the clamping thrust gradually and evenly. To this end, according to this invention, in a rapid action clamp of the kind described above, the clamping strut or another part through which the clamping thrust is transmitted is compressible in the direction of thrust transmission against spring loading.

The spring loading is arranged in such a way that although the operator needs to apply only a moderate torque throughout the clamping movement, a high clamping thrust is applied gradually by the clamping strut through the thrust plunger to the part which is to be clamped. Moreover the spring system is arranged in such a way that during the last part of the clamping action a rigid thrust is developed, that is to say a non-resilient thrust, so as to clamp the part with the exclusion of oscillation.

In a preferred example of the invention plate springs, preferably in the form of Belleville washers, are used for supporting the clamping strut. In an example of the clamp which has an externally screw threaded tension part the clamping strut consists of two parts, one of which slides axially within the other, plate springs being interposed between the two to urge them apart.

Another example of the clamp is arranged with an internally screw threaded tension part. In this case the thrust plunger consists of two parts, the one sliding within the other, the plate springs being interposed between these two parts to urge them apart.

Some examples of clamps in accordance with the invention will now be described with reference to the accompanying drawings, in which.

Figure 1:
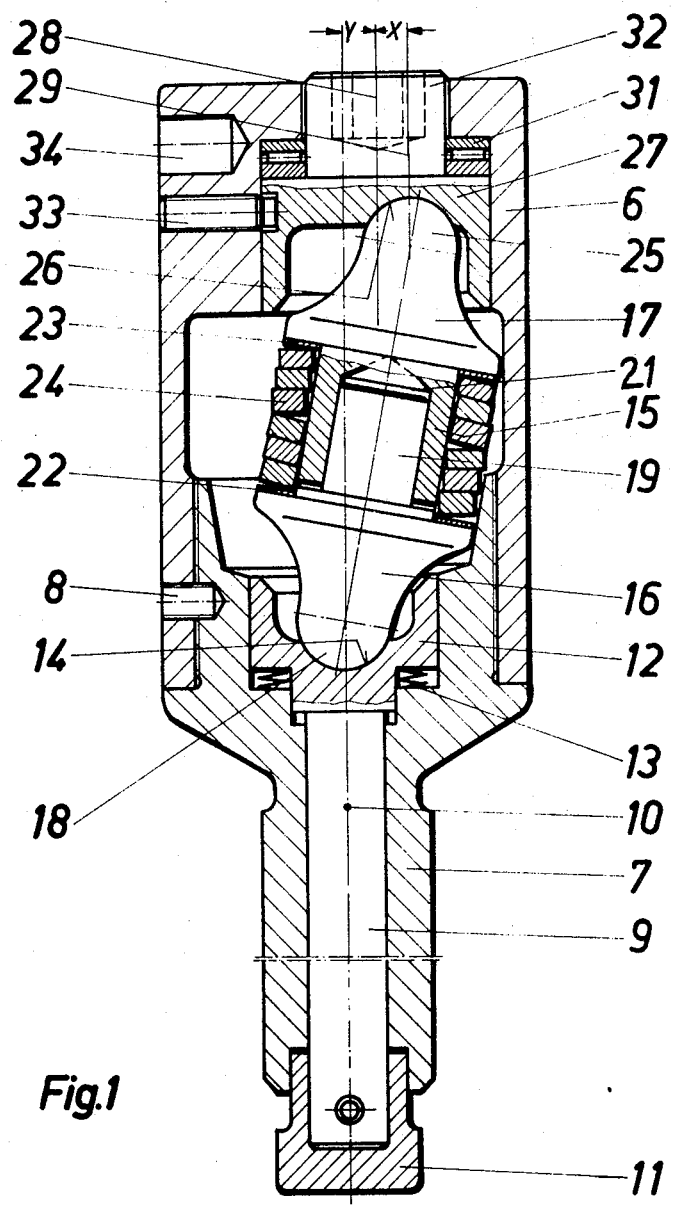
FIG. 1 is a vertical section through one example in which a tension part is externally screw threaded.

The example shown in FIG. 1 comprises a cylindrical housing 6 into the lower end of which an externally threaded rod 7 is screwed. The rod 7 is locked in place, that is to say is prevented from unscrewing again, by a locking pin 8. The externally threaded rod 7 contains an axially slidable thrust plunger 9 on the lower end of which a plunger cap 11 is mounted. The upper end of the thrust plunger 9 terminates, inside the externally threaded rod 7 in a cup shaped flange 12. Between the shoulder of the cup shaped flange 12 and a corresponding shoulder of the externally threaded rod 7, a small and comparatively weak plate spring or Belleville washer 13 is interposed. The spring 13 tends to lift the thrust plunger 9. The axis 10 of the thrust plunger 9 extends coaxially with respect to the cylindrical housing 6. The upper surface of the cup shaped flange 12 contains a cup shaped central recess 14, which is concentric with the axis 10 of the plunger. The cup shaped recess 14 accommodates a spherical lower end 18 of a clamping strut 15. When the rapid action clamp is in the non-tightened state the axis of the clamping strut 15 is skew or inclined to the axis 10 of the thrust plunger 9, this being the central axis of the clamp.

In this example the clamping strut 15 consists of two parts, a lower part 16 and an upper part 17. The spherical lower end 18 of the lower part 16 fits in the cup shaped recess 14 of the plunger flange 12. The part 16 has a cylindrical pin 19 which slides in a blind bore 21 of the upper part 17 of the clamping strut so that the two parts 16 and 17 can slide together and apart from each other. Between the two parts 16 and 17 there are plate springs 24 thrusting against thrust washers 22, 23.

The upper part 17 of the clamping strut 15 has a spherical end 25 which fits in a cup shaped recess 26 in an eccentric actuator cup 27 mounted rotatably in the upper part of the cylindrical housing 6. The axis of rotation of the actuator cup 27 is eccentric with respect to the axis 10 of the thrust plunger 9, the two axes being separated from each other by a distance Y. The geometric center 29 of the spherical end 25 of the upper clamping strut part 17 is located, when the rapid clamp is in the non-tightened state, eccentric with respect to the axis of rotation of the actuator cup 27, by a distance X. The end thrust applied by the actuator cup 27 is taken in the cylindrical housing 6 by an axial thrust bearing 31. The actuator cup 27 has an upper end which projects from the upper end of the cylindrical housing 6 and contains a hexagonal socket 32 into which the operator can insert a key for rotating the actuator cup 27. This rotation is however limited to 180° by a stop-pin 33 which extends radially inwards through the wall of the housing 6. The stop-pin 33 moves in an interrupted slot in the periphery of the actuator cup 27, limiting rotation of the actuator cup to an angle of 180°. The peripheral wall of the cylindrical housing 6 contains a blind bore 34 into which the operator can insert a tool for initial rotation of the clamp.

The clamp shown in FIG. 1, with an externally screw threaded tension member 7 is operated as follows:

The operator, wishing for example to clamp a cutting tool firmly down onto the surface of the tool rest of a lathe, first ensures that the strut 15 is in its skew position and then screws the clamp down through a part of the lathe rest, until the plunger cap 11 holds the cutting tool firmly down, the operator using for this purpose a tool inserted into the blind bore 34. To obtain the final tightening effect the operator inserts a hexagonal key into the socket 32 and rotates the actuator cup 27. This rotates the upper end of the clamping strut 15, moving it around in a circular path and so bringing the clamping strut into an axial position, moving the center of the upper spherical end 25 through a distance of $2x$ which equals $x + y$ where $y = x$. This thrusts the plunger 9 downwards, thrusting the cutting tool more firmly into contact with the surface of the lathe rest. In this movement thrust is applied through the clamping strut 15, the plate springs 24, the thrust plunger 9 and the plunger cap 11 to the cutting tool. In the first part of the final tightening movement the plate springs 24 are compressed. In the final phase of the movement, after the plate springs 24 have been fully compressed, the clamping strut 15 acts as a rigid strut, applying the final clamping thrust positively, that is to say non-resiliently. The entire final clamping movement proceeds easily, the applied thrust increasing gradually, due to the action of the plate springs during the early phase of the movement.

Figure 2:
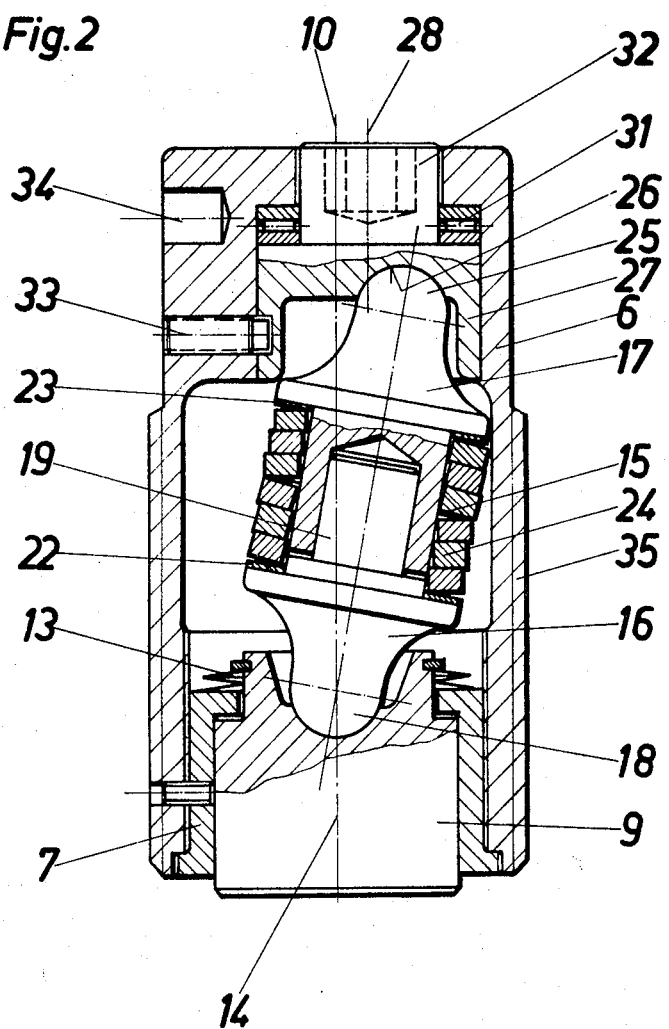
FIG. 2 is a similar section of a modification of the clamp shown in FIG. 1.

The clamp shown in FIG. 2 corresponds in its construction essentially to that shown in FIG. 1. The same index numbers have therefore been used for corresponding parts. The example shown in FIG. 2 differs however mainly in that the externally threaded rod 7 and the thrust plunger 9 are somewhat differently constructed and arranged. In particular these two parts are shorter. In this case the cylindrical housing 6 has an external thread 35, allowing the housing 6 to be screwed directly for example into a part of a lathe rest. In other respects the example shown in FIG. 2 functions in the same way as the example shown in FIG. 1.

Figure 3:
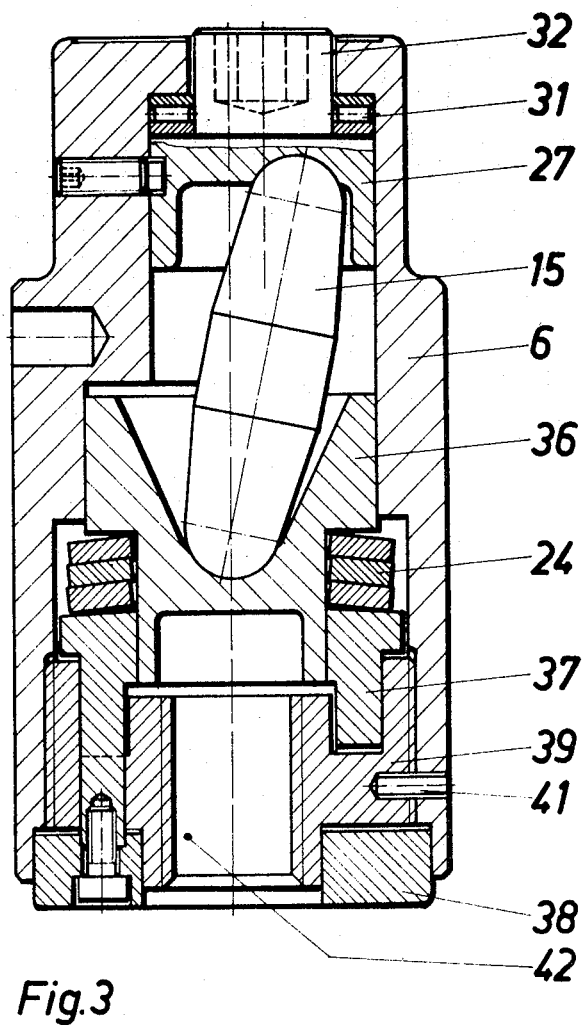
FIG. 3 is a vertical section through another example in which a tension part is internally screw threaded; and, FIG. 4 is a vertical section through another example which is arranged for actuating a clamping claw.

The example shown in FIG. 3 differs from the first two examples in that it has an internally screw threaded tension part. In this example the thrust plunger consists of an upper part 36 and a lower part 37, between which are interposed plate springs 24. Attached to the lower end of the thrust plunger part 37 there is a cap plate 38. The lower thrust plunger part 37 slides up and down in a guide bush 39. The cap plate 38, attached to the plunger part 37, slides up and down between the peripheral surface of the lower part of the guide bush 39 and an inner surface of the cylindrical housing 6.

The guide bush 39 itself is screwed into the lower part of the cylindrical housing 6, being prevented from unscrewing again by a radial locking pin 41.

The guide bush 39 has a central screw threaded bore 42 into which can be screwed the externally threaded upper end of a spacer rod which is not shown in the drawing. The spacer rod can for example be inserted through a bore in a part of a lathe rest, to one side of the cutting tool. This example of the clamp functions similarly to the first two examples. To obtain final tightening of the clamp the operator rotates the eccentric actuator cup 27 using a hexagonal key, as described above, swinging the clamping strut 15 into an axial position so applying the final clamping thrust through the thrust plunger parts 36, 37 and through the cap plate 38 and through the lathe rest plate to the cutting tool.

Figure 4:
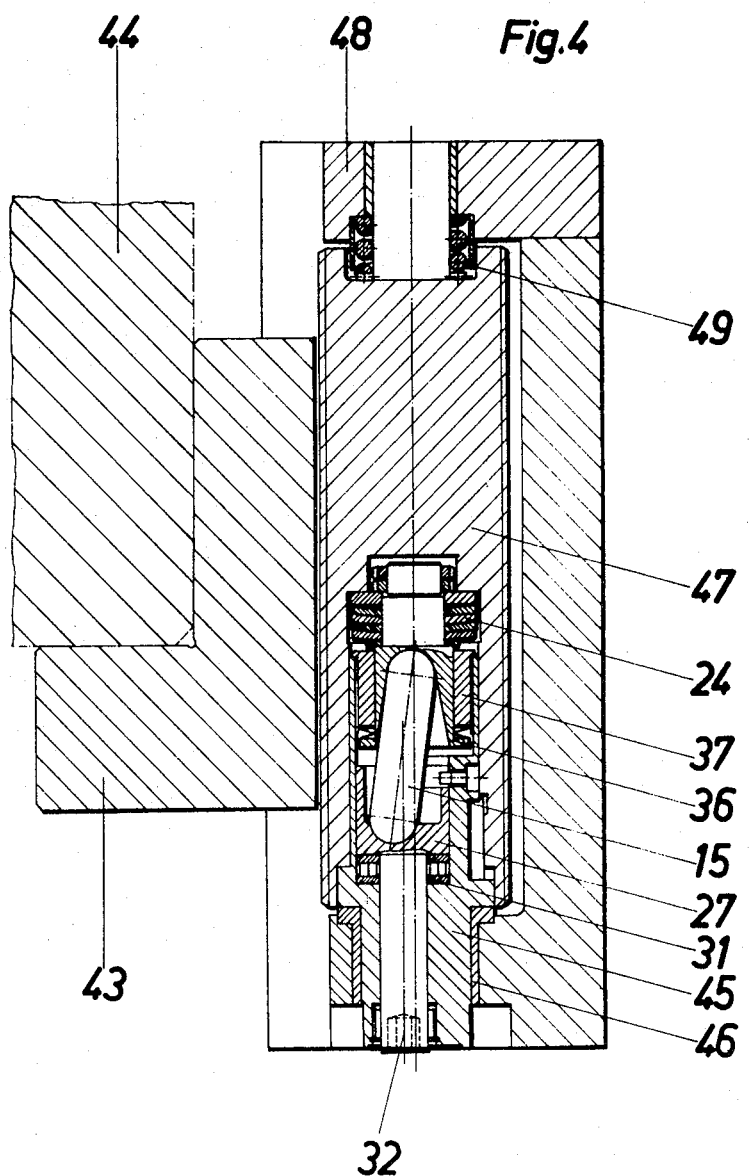

With regard to the example shown in FIG. 4, this is essentially analogous in construction to the previously described examples. In this case however the tool 44 is clamped by the action of a clamping claw 43. In this case the eccentric actuator cup 27 rotates in a collared guide bush 45, which is itself rotatably mounted in a stationary bush 46. The thrust plunger consists of an inner collared part 36 and an outer part 37. Thrust is applied by the inner plunger part 36 through plate springs 24 to an externally threaded thrust spindle 47 which is capable of rotating on a bearing of a lower bearing plate 48, the thrust spindle 47 being axially spring loaded by a thrust spring 49.

This example of the clamp functions as follows:

Suppose that the operator wishes to clamp a workpiece up against the face plate of a lathe. To obtain a preliminary clamping effect the operator applies a tool around the hexagonal lower end of the collared guide bush 45, rotating the latter and rotating the externally screw threaded thrust spindle 47. This brings the threaded clamping claw 43 up against the surface of the workpiece 44, thrusting the workpiece firmly against the face plate of the lathe. To obtain the final clamping effect the operator inserts a hexagonal tool into the socket 32 and rotates the actuator cup 27, swinging the clamping strut 15 into an upright axial position. This compresses the plate springs 24, so that the clamping claw 43 clamps the workpiece 44 more firmly against the face plate, the final clamping effect taking the form of a positive, rigidly applied thrust, as described above.

I claim:

1. In a rapid action clamp comprising a housing, a thrust plunger for applying thrust to the part which is to be clamped, means mounting said thrust plunger for axial slidable movement within said housing, a clamping strut in said housing, means pivotally connecting said clamping strut to said thrust plunger, an actuator, means rotatably mounting said actuator to said housing for rotation about an axis eccentric to the axis of said thrust plunger, means preventing axial movement of said actuator relative to said housing, means defining a recess in said actuator and means on said clamping strut at the end thereof remote from said thrust plunger fitting rotatably and rockably in said recess, whereby rotation of said actuator moves said clamping strut between a position in which it is skew to said plunger axis and a position in which it extends along said axis, the improvement comprising spring loading means resisting axial compression movement of said clamping strut or another part through which said clamping thrust is transmitted from said actuator to said part which is to be clamped, said compression movement taking place in the direction of thrust transmission against the action of said spring loading means.

2. In a rapid action clamp comprising a housing, a thrust plunger for applying thrust to the part which is to be clamped, means mounting said thrust plunger for axial slidable movement within said housing, a clamping strut in said housing, means pivotally connecting said clamping strut to said thrust plunger, an actuator, means rotatably mounting said actuator to said housing for rotation about an axis eccentric to the axis of said thrust plunger, means preventing axial movement of said actuator relative to said housing, means defining a recess in said actuator and means on said clamping strut at the end thereof remote from said thrust plunger fitting rotatably and rockably in said recess, whereby rotation of said actuator moves said clamping strut between a position in which it is skew to said plunger axis and a position in which it extends along said axis, the improvement comprising means directly or indirectly spring loading said clamping strut.

3. A clamp as claimed in claim 1, wherein said spring loading means comprises a plurality of plate springs.

4. A clamp as claimed in claim 3, wherein said clamping strut comprises two parts, one of said parts being axially slidable within the other of said parts and said plate springs acting between said two parts to urge said parts apart from each other.

5. A clamp as claimed in claim 2, wherein said thrust plunger comprises two parts, one of said parts being axially slidable relative to the other of said parts and said plate springs act between said two parts to urge said parts apart from each other.

6. A clamp as claimed in claim 3, in which said plurality of plate springs are assembled together to form a stack.

* * * * *